June 2, 1936.  E. E. WEMP  2,042,570
VIBRATION DAMPENER
Filed Jan. 28, 1935  2 Sheets-Sheet 1
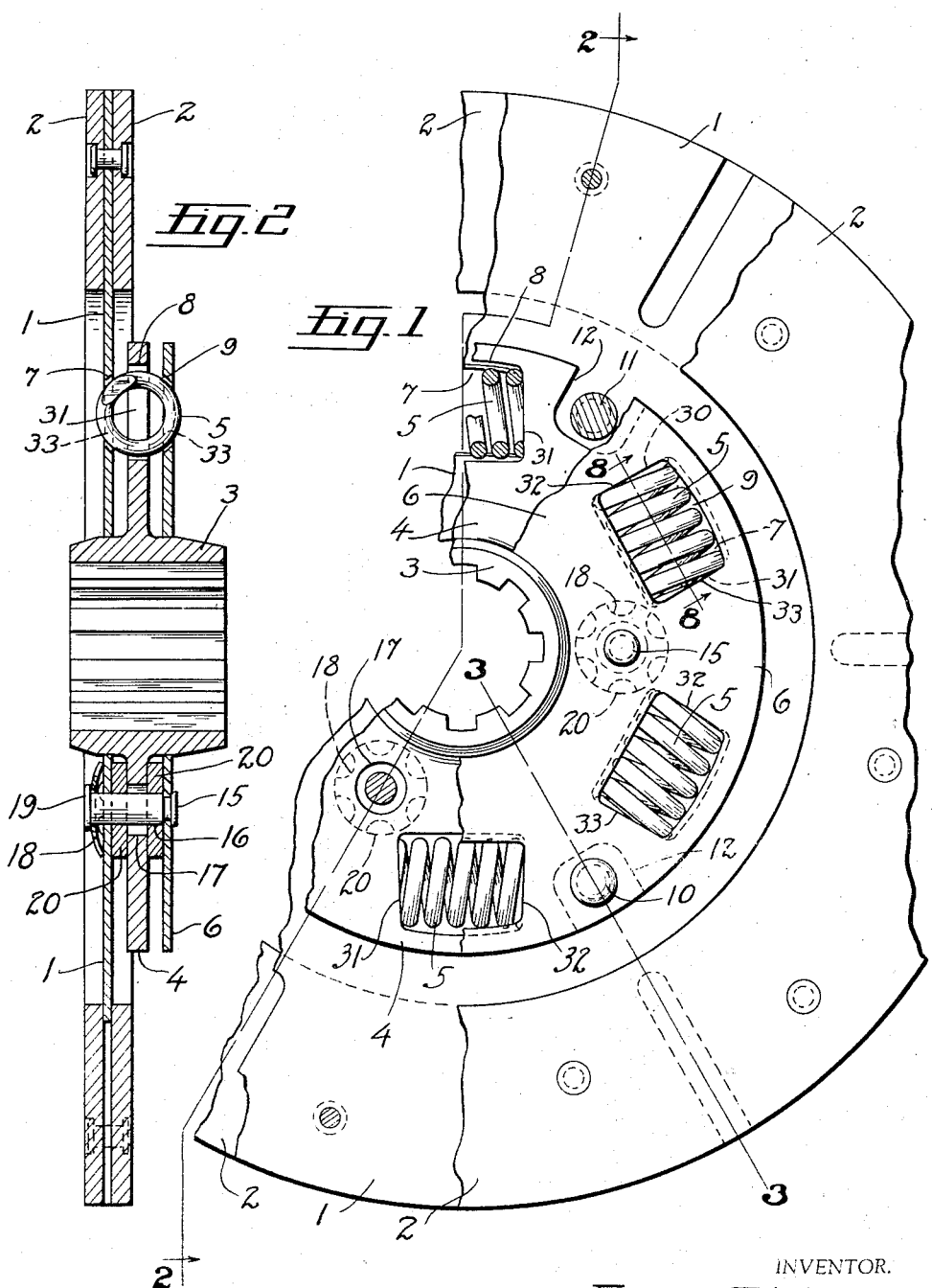
INVENTOR.
ERNEST E. WEMP
BY
Barnes, Kisselle, Laughlin & Raisch
ATTORNEYS.

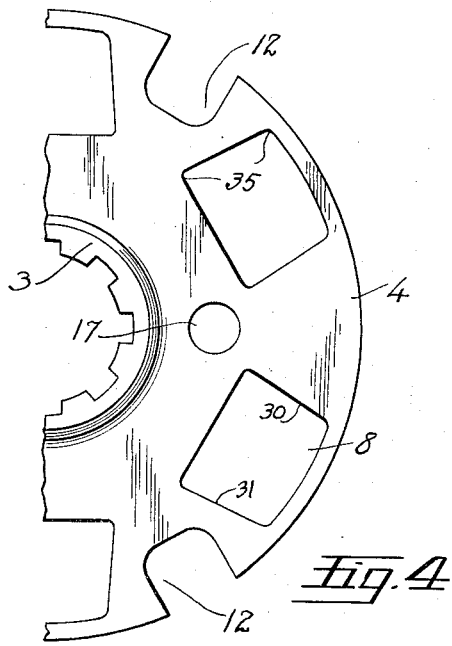
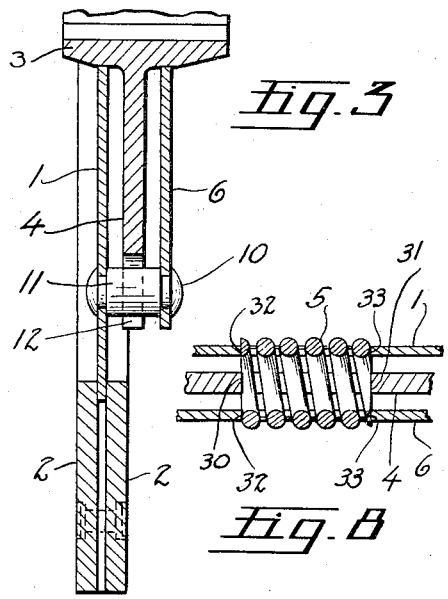
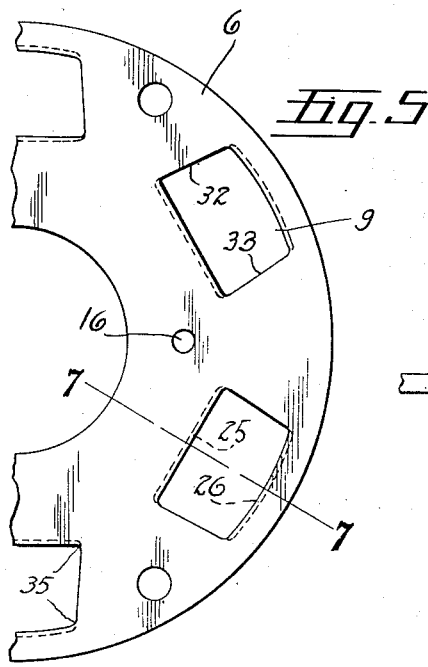
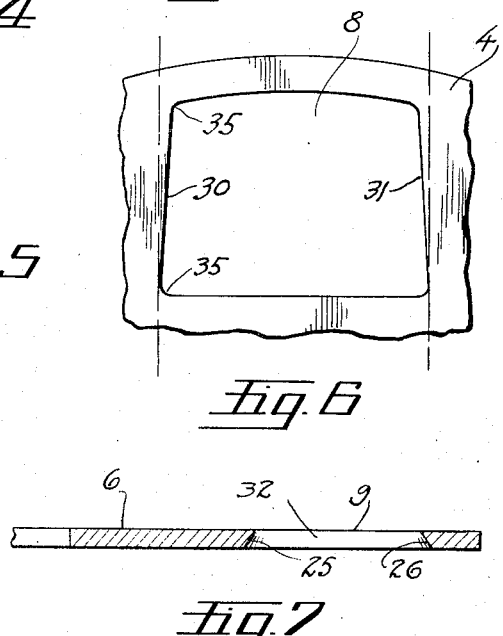
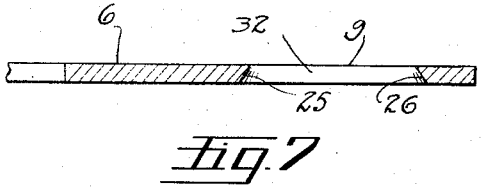

Patented June 2, 1936

2,042,570

UNITED STATES PATENT OFFICE 2,042,570

VIBRATION DAMPENER

Ernest E. Wemp, Detroit, Mich.

Application January 28, 1935, Serial No. 3,794

12 Claims. (Cl. 192—68)

This invention relates to a structure for transmitting driving power, as for example from one rotary element to another, to dampen vibrations and provide a cushion drive. The invention is directed particularly to such a structure for use in automotive vehicles.

The invention may be incorporated in a clutch driven member which has a friction disc on a hub, and the invention centers around a coil spring arrangement for establishing a driving connection between the disc and hub. Now, obviously the invention may be embodied in structures other than a clutch disc, but such environment is used for the purpose of this disclosure.

In carrying out the invention an annulus of coil springs is used mounted in aligned openings in overlapping parts of the disc and hub, and one of the principal objects of the invention is a construction simple in nature and yet effective and efficient for holding the springs in position in the aligned openings. A further object of the invention is to provide a structure for minimizing the wear on the springs due to relative movement produced by spring flexure, and to this end the structure embodies an arrangement for compensating for centrifugal force which tends to throw the springs outward against the outer boundary of the openings, thus to substantially neutralize any displacement effect upon the springs. These and further objects will become more apparent as the following detailed description progresses.

Fig. 1 is a partial side elevational view, with some parts cut away, of a clutch driven disc in which the invention is incorporated.

Fig. 2 is a sectional view taken through a clutch driven member substantially on line 2—2 of Fig. 1.

Fig. 3 is a sectional view taken on line 3—3 of Fig. 1.

Fig. 4 is a partial elevational view of the hub member.

Fig. 5 is a partial side elevational view of a washer member.

Fig. 6 is an enlarged and exaggerated view illustrating the formation of one of the spring openings in the hub member.

Fig. 7 is a sectional view taken substantially on line 7—7 of Fig. 5.

Fig. 8 is a sectional view taken substantially on line 8—8 of Fig. 1.

The clutch driven member, as shown herein, comprises a disc 1 with friction facings 2 secured thereto and adapted to be packed between driving members. The hub for the disc is shown at 3 having a flange 4. The vibration dampening structure is associated with the disc and flange to provide a driving arrangement between them. For this purpose a plurality of coil springs 5 may be arranged in an annulus with each spring disposed in aligned openings in the disc and flange, and a washer member 6. The openings in the disc are shown at 7. The openings in the flange are shown at 8. The openings in the washer are shown at 9.

The disc and washer are connected together for movement in unison, and to this end they may be joined by long rivets 10 (Fig. 3) having an enlarged center portion 11 for spacing the disc and washer. These rivets may pass through notches 12 in the hub flange 4 with considerable clearance to permit of relative movement between the disc and washer on the one hand and the hub on the other, as the springs are flexed. This movement may be controlled and dampened by friction means, as illustrated in Fig. 2. This means may take the form of several rivets 15, each of which extends through an aperture 16 in the washer and projects through an enlarged clearance aperture 17 in the hub and through the disc 1, and a spring washer 18 may underlie the head 19 of the rivet. On opposite sides of the flange is disposed friction means, and this means may take the form of small washers or buttons 20 through which the rivets 15 extend, with the buttons fitting snugly on the rivets. As a result, relative movement between the hub flange on the one hand and a disc and washer on the other creates a frictional action between the flange and the opposing buttons 20.

It is thought that the general operation of this arrangement will be readily appreciated. Vibrations communicated to disc 1, as for example from an internal combustion engine, may cause relative movement between the disc and hub 3 by reason of the flexing of the springs. It will be appreciated that the ends of each spring abut against the aligned walls of the apertures in which the spring lies, as shown in Fig. 8. Driving force from the disc to the hub, or vice versa, is through the springs. In this form of structure each spring serves to take a driving force irrespective of whether the force comes from the disc to the hub or from the hub to the disc. It becomes apparent by reference to Fig. 8: if the driving force should come from the hub to the disc, with force from right to left as Fig. 8 is viewed, the right hand end convolution of the spring is picked up by the wall of the opening in the flange 4, and the end of the spring is moved away from the adjacent walls of the openings in the washer 6 and disc 1. If the driving force comes from right to left from the disc and washer, the end of the spring is picked up and moved away from the adjacent wall of the opening of flange 4. The reverse of these actions takes place at the opposite end of the spring. In any event, however, a positive limit to the flexing is provided by the rivets 10 passing through the clearance notches 12.

It will be observed that the openings 7 and 9 in the disc and washer respectively have a radial dimension less than the diameter of the spring, and accordingly the springs are held in the aligned apertures. Due to this, however, the outside surfaces of the spring convolutions, and particularly the convolutions near the spring ends, will rub against the metal defining the openings 7 and 9 when the spring is flexed. After a considerable period of time the springs become marked or scored due to this action. However, it has been found that such marking or scoring of the coil springs is less detrimental on the outside of the convolutions than on the inside because there is less stress in the metal near the outside of the convolutions than in the metal near the inside of the convolutions. Accordingly, there is a material advantage in holding the springs in the apertures from the outside rather than from the inside.

The coil springs, of course, are of high carbon steel, and in order to provide a high safety factor for the holding of the springs in the apertures, the disc 1 and washer 6 are preferably of high carbon heat treated steel so as to minimize wear tending to enlarge the apertures therein, such as may let the springs fall out. Moreover, the apertures in the disc and washer are so formed, preferably, as to provide a surface contact with the spring, and for this purpose the walls of the apertures are inclined as at 25 and 26 (Fig. 7) at their upper and lower edges. Fig. 7 shows one aperture in the washer, and the apertures in the disc may be identical therewith. The apertures in the flange, however, need not be so constructed, since the walls thereof have no scrubbing or rubbing action on the spring, but merely abut against the spring ends. It will be also observed that the radially outward wall of the apertures in each member is of curved formation, advantageously curved on an arc around the hub center, so that sufficient clearance is afforded in order that there will not be any binding action on the spring convolutions when the same are flexed. The springs are of straight cylindrical form in over-all dimensions, and when one end is picked up by a driving or vibration force and shifted relative to the other end and relative to the walls of an aperture, the same moves in an arc around the center, and the outside walls of the apertures may be formed on a parallelling arc to maintain clearance.

A further matter presents itself relative to the marking or scoring of the springs between aperture walls, and this is incident to centrifugal force to which the springs are subjected. The centrifugal force tends to throw the springs against the outside walls of the apertures. If this is not prevented the scoring action on the springs by the outside walls of the apertures 7 and 9 is materially increased. The invention provides a structure for overcoming the detrimental action of this centrifugal force, and which, in effect, serves to balance the centrifugal force so that the springs are retained more or less neutrally in the apertures. To this end the apertures are formed so that their end walls diverge as they extend radially inwardly. In other words, the dimension across the apertures measured in the direction parallelling the axis of the spring is greater near the hub than near the outer wall of the apertures. This is shown in an exaggerated manner in Fig. 6 where the opposing walls of the aperture 8 in the hub flange, as shown at 30 and 31, diverge inwardly; the dash lines are drawn in on the figure to illustrate lines in parallel. The walls of the apertures 10 in the disc 1 and washer 6 are similarly formed so that when the apertures are aligned the end walls of the three apertures are parallel. This inclination need not be to any great degree; for example, in one construction where the radial width of the apertures in the hub flange was about .712", the dimension across the aperture near its outside wall was about .990", and across the aperture at its inner wall 1.010". In the disc and washer the apertures had a radial dimension of about .582", and the outside and inside lengthwise dimensions being .992" and 1.008" respectively.

Preferably, the springs are under some compression when the apertures are in alignment, and as a result the springs are tensioned more in their portions radially removed from the axis of rotation than in the portions next adjacent the axis of rotation. This, accordingly, tends to urge the springs bodily inwardly. This tendency overcomes a centrifugal force, or substantially overcomes a centrifugal force, tending to throw the springs radially outwardly. Accordingly, the springs are positioned in a more or less neutral manner in the apertures and scrubbing or rubbing between the springs and the outer walls in the apertures due to centrifugal force is minimized.

The structure has a further advantage in that the apertures 7 and 9 in the disc and washer have a dimension measured substantially radially which is shorter than the outside diameter of the spring, and accordingly a greater amount of metal is provided between the inner corners of adjacent apertures. This becomes particularly advantageous in clutch discs of large torque capacity where a considerable number of coil springs are necessary. In the arrangement shown herein six coil springs are used in the annulus, and in structures of higher torque capacity, 8 or 10 or more springs are required. Accordingly, the springs have to be positioned closer together, thus cutting down the metal between the apertures. This saving of metal, which is afforded by the relatively small size of apertures in the disc and washer, materially facilitates and adds to the strength of the parts by the increase of metal between the apertures. Preferably, the corners of the apertures are somewhat rounded as at 35, and this may be in the hub flange and disc and washer, to minimize any tendency of the metal to crack or split at these points. Moreover, it is preferable that the end convolutions of the springs be rounded off at the edges so as to leave no sharp cutting parts which would tend to cause excessive wear on the walls of the apertures.

The assembly is one very easily made, as the parts may be properly positioned, the springs inserted in the apertures, and the several rivets connecting the parts spun over to complete the assembly. This eliminates any threading operation which is necessary where the springs are held in place by strips, wires or elements threaded through the springs.

I claim:

1. A rotary clutch member comprising, a disc, a hub for the disc, a flange on the hub overlapping the disc, a washer member on a side of the flange opposite the disc, the disc, flange and washer having substantially aligned apertures, a coil spring positioned in each group of aligned apertures, means tying the disc and washer together for movement in unison, said springs serving to connect the disc and washer in driving relation with the hub, friction means positioned between the disc and flange and the washer and flange, whereby the disc and washer are separated axially and the springs project only partially into the apertures therein, and said apertures in the disc and washer measured in a radial direction having dimensions less than the diameter of the springs for retaining the same in said aligned apertures.

2. A rotary clutch member comprising, a disc, a hub for the disc, a flange on the hub overlapping the disc, a washer member on a side of the flange opposite the disc, the disc, flange and washer having substantially aligned apertures, a coil spring positioned in each group of aligned apertures, means tying the disc and washer together for movement in unison, said springs serving to connect the disc and washer in driving relation with the hub, friction means positioned between the disc and flange and the washer and flange, whereby the disc and washer are separated axially and the springs project only partially into the apertures therein, and said apertures in the disc and washer measured in a radial direction having dimensions less than the diameter of the springs for retaining the same in said aligned apertures, and said apertures in the disc and washer having their walls which extend in a circumferential direction, beveled for surface contact with the springs.

3. In a vibration dampener, rotary members having substantially aligned apertures, a coil spring in the aligned apertures arranged to abut against opposite aperture walls to establish a driving connection between the rotary members, said opposite walls of the rotary members diverging in a generally radially inward direction.

4. In a vibration dampener, rotary members each having a plurality of apertures, and said apertures in the members being substantially aligned, a coil spring positioned in each group of aligned apertures with the axis of each spring positioned substantially at right angles to a radial line therethrough, said coil springs arranged to abut at its ends opposite walls of the apertures to establish a drive between the rotary members and said opposite walls diverging from each other in a generally radially inward direction.

5. In a vibration dampener, three overlapping rotary members, each having a plurality of apertures therein, and said apertures being disposed in alignment, a coil spring situated in each group of aligned apertures whereby the springs establish a driving connection between some of the rotary members by abutment at their ends with aperture walls, said walls of each aperture so engaged by the spring ends diverging radially inwardly, whereby spring pressure tends to urge the springs radially inwardly to substantially offset centrifugal force.

6. In a vibration dampener a rotary member with a flange, a plurality of apertures in the flange, coil springs positioned in the apertures with their axes disposed substantially at right angles to a radial line through the center portions of the springs, two other members, one on each side of the flange, means securing the two other members together for movement in unison, said two other members each having a plurality of apertures for receiving said springs, whereby the springs abut end walls of the apertures and provide a driving connection between the flange and the said two members, the said apertures in the said two members having a dimension, measured radially, which is less than the diameter of the springs for holding the springs in the apertures, and the walls of each aperture against which the ends of the springs abut diverging from each other in a generally radially inward direction, whereby pressure of the springs against said walls tends to urge the springs radially inwardly to substantially offset centrifugal action.

7. A clutch member comprising, a disc, a hub therefor, a flange on the hub overlapping the disc, a washer member on the opposite side of the flange from the disc, means connecting the disc and washer member together for rotation in unison, a plurality of apertures in the flange, a coil spring positioned in each aperture, with the axis of each spring substantially at right angles to a radial line through the center portion of the respective spring, said disc and washer having a plurality of apertures, the dimension of which, measured radially, is less than the outside diameter of the springs, whereby the springs project into said apertures in the disc and washer and are held from displacement, the ends of the springs abutting opposite end walls of said apertures and serving to establish a driving connection between the hub and the disc and washer, said end walls of the apertures diverging in a generally radially inward direction, whereby pressure of the springs against said walls tends to urge the springs radially inward to substantially offset centrifugal force.

8. A clutch driven member comprising, a central member having a plurality of apertures, a coil spring in each aperture, two other members, one on each side of the central member, each having apertures aligned with the apertures in the central member for receiving said springs, said springs abutting against the end walls of said apertures for establishing a driving connection between the central member and the said two members, means tying the said two members together for movement in unison, friction means between the central member and each of the said two members whereby all of said members are separated axially and the springs project only partially into the apertures of said two other members, and said apertures in the said two other members measured in a substantially radial direction having dimensions less than the outside diameter of the springs for retaining said springs in said aligned apertures.

9. A clutch driven member comprising a central member having a plurality of apertures, a coil spring in each aperture, two other members, one on each side of the central member, each having apertures aligned with the apertures in the central member and for receiving said springs, means tying the said two other members together for movement in unison, said springs serving to connect the central member and the said two other members in driving relation, friction means between the central member and each of the said two other members whereby the said two other members are spaced from the central member and the springs project only partially into the apertures therein, and said apertures in the said two other members measured in a substantially radial direction having a dimension less than the outside diameter of the springs for retaining the springs in said aligned apertures, and said apertures in the said two other members having their walls which extend in a circumferential direction beveled for surface contact with the springs.

10. In a vibration dampener, a rotary central member, two other members arranged to rotate in unison and disposed one on each side of the central member, coil springs for establishing a driving connection between the central member and the said two other members, a plurality of rivets or the like connecting the said two members, said central member having a clearance aperture for each rivet, and a pair of individual friction buttons on each rivet disposed on opposite sides of the central member and between the central member and the said two other members, for effecting frictional action upon relative movement between the central member and the said two other members.

11. In a vibration dampener, a rotary central member, two other members arranged to rotate in unison and disposed one on each side of the central member, coil springs for establishing a driving connection between the central member and the said two other members, a plurality of rivets or the like connecting the said two members, said central member having a clearance aperture for each rivet, a pair of individual friction buttons on each rivet disposed on opposite sides of the central member and between the central member and the said two other members for effecting frictional action upon relative movement between the central member and the said two other members, and spring means acting upon said rivets for creating friction on said buttons.

12. A clutch driven member comprising a hub, a flange on the hub, a plurality of apertures in the flange, a coil spring located on each aperture, a disc member on one side of the flange, a washer on the opposite side of the flange, said disc member and washer arranged to rotate in unison and each having apertures therein substantially aligned with the apertures in the flange for receiving said springs, a plurality of rivets or the like connecting the disc member and washer, said flange having clearance apertures through which the rivets extend, and a pair of individual friction buttons on each rivet, one lying between the flange and disc and the other between the flange and washer for effecting friction upon relative movement between the flange and the disc and washer, and spring means for packing the buttons between the flange, disc and washer.

ERNEST E. WEMP.